US012024409B2

(12) United States Patent
Hall et al.

(10) Patent No.: US 12,024,409 B2
(45) Date of Patent: Jul. 2, 2024

(54) LINE GRIPPING WINCH DRUM

(71) Applicant: Hall Labs LLC, Provo, UT (US)

(72) Inventors: Michael Hall, Provo, UT (US); David R. Hall, Provo, UT (US); Michael Shinedling, Provo, UT (US); Chandler Flinders, Provo, UT (US); Nathan Davis, Bountiful, UT (US)

(73) Assignee: Hall Labs LLC, Provo, UT (US)

( * ) Notice: Subject to any disclaimer, the term of this patent is extended or adjusted under 35 U.S.C. 154(b) by 0 days.

(21) Appl. No.: 17/719,318

(22) Filed: Apr. 12, 2022

(65) Prior Publication Data

US 2022/0324684 A1 Oct. 13, 2022

Related U.S. Application Data

(60) Provisional application No. 63/173,980, filed on Apr. 12, 2021.

(51) Int. Cl.
*B66D 1/74* (2006.01)
*B66D 1/46* (2006.01)

(52) U.S. Cl.
CPC ............. *B66D 1/7415* (2013.01); *B66D 1/46* (2013.01); *B66D 1/7447* (2013.01)

(58) Field of Classification Search
CPC ...... B66D 1/7415; B66D 1/7447; B66D 1/74; B66D 1/46; B66D 1/30; B66D 1/36; B66D 1/365; B66D 1/28; B66D 1/08; B66D 1/12; B66D 1/00; B66D 1/56; B66D 3/04; B66D 3/20; B66D 3/26; B66D 2700/025; B66D 2700/026; B66D 2700/0191;
(Continued)

(56) References Cited

U.S. PATENT DOCUMENTS 574,580 A * 1/1897 Serve ...................... F16H 55/38 474/175
2,802,366 A * 8/1957 Bonier et al. ........... F16H 55/50 226/193
(Continued)

FOREIGN PATENT DOCUMENTS

CN 111911114 A * 11/2020 ............... B66D 1/12
KR 20130123271 A * 11/2013
(Continued)

*Primary Examiner* — Michael R Mansen
*Assistant Examiner* — Henrix Soto

(57) ABSTRACT

A winch drum is disclosed. In a first aspect, a first set of teeth are positioned around an outer perimeter of a drum. The first set of teeth taper from a first crown to a first base. A second set of teeth are positioned around the outer perimeter of the drum. The second set of teeth taper from a second crown to a second base. The second set of teeth are offset from the first set of teeth such that a gap between the first bases and the second bases forms a sinusoidal channel for a line to follow the first set of teeth and the second set of teeth becomes a guide for the line so that the line can engage the sinusoidal channel. The line follows the sinusoidal channel and each change of direction along the sinusoidal path causes the line to engage by friction with the first bases and the second bases. In a second aspect, the drum includes a trough that follows a sinusoidal path and wherein the trough is narrower at its bottom than at its top.

8 Claims, 6 Drawing Sheets

(58) Field of Classification Search

CPC .... B66D 2700/0183; B66D 2700/0125; B66D 2700/0108; F16H 55/36; F16H 55/38; F16H 55/50; B65H 75/26; B65H 75/265

USPC .......................................................... 254/344

See application file for complete search history.

(56) References Cited

U.S. PATENT DOCUMENTS

| | | | | | |
|---|---|---|---|---|---|
| 3,844,537 | A * | 10/1974 | Rinio | B66D 1/7415 | 474/94 |
| 4,413,981 | A * | 11/1983 | White | F16H 55/50 | 474/902 |
| 5,405,027 | A * | 4/1995 | Plass | B66D 1/56 | 254/269 |
| 5,722,640 | A * | 3/1998 | Skyba | F16H 55/38 | 254/371 |
| 6,027,103 | A * | 2/2000 | Painter | B66D 1/7415 | 254/362 |
| 6,371,448 | B1 * | 4/2002 | De Angelis | F16H 55/50 | 474/169 |
| 7,841,583 | B1 * | 11/2010 | Kureck | B66D 1/48 | 254/275 |
| 2001/0013593 | A1 * | 8/2001 | Buhlmayer | B66D 1/30 | 254/342 |
| 2004/0099852 | A1 * | 5/2004 | Hoffend, Jr. | B66D 1/00 | 254/331 |
| 2010/0237306 | A1 * | 9/2010 | Eschelbacher | B66D 5/30 | 254/362 |
| 2014/0138340 | A1 * | 5/2014 | Miller | B66D 1/36 | 254/338 |

FOREIGN PATENT DOCUMENTS

| | | | |
|---|---|---|---|
| KR | 20160012638 | A * | 2/2016 |
| WO | WO-2020141505 | A1 * | 7/2020 |

* cited by examiner

LINE GRIPPING WINCH DRUM

CROSS-REFERENCE TO RELATED APPLICATIONS

This application claims priority to provisional patent 63/173,980 filed Apr. 12, 2021 and titled "Line Gripping Winch Drum." The entire disclosure of this prior application is incorporated herein by reference.

TECHNICAL FIELD

This disclosure relates generally to winches.

BACKGROUND

Winches and hoists have proven useful tools in moving objects of considerable size and weight. Winches function by winding or unwinding the line that is coiled around a horizontal rotating drum and thereby pulling a load. A hoist is a device used for lifting or lowering a load by means of a drum or lift-wheel around which the line wraps. In both instances, spooling of the line around the drum or similar causes wear on the line and other issues. Improved winching, hoisting, and climbing devices are needed.

SUMMARY

In a first aspect, the disclosure provides a winch drum. A first set of teeth are positioned around an outer perimeter of a drum. The first set of teeth taper from a first crown to a first base. A second set of teeth are positioned around the outer perimeter of the drum. The second set of teeth taper from a second crown to a second base. The second set of teeth are shifted axially along the drum and offset from the first set of teeth such that a gap between the first bases and the second bases forms a sinusoidal channel for a line to follow, the first set of teeth and the second set of teeth becomes a guide for the line so that the line can engage the sinusoidal channel. The line follows the sinusoidal channel and each change of direction along the sinusoidal path causes the line to engage by friction with the first bases and the second bases.

In a second aspect, the disclosure provides a winch drum. A trough encircles the winch drum. The trough is narrower at a bottom of the trough. The trough is wider at a top of the trough. The trough follows a sinusoidal pattern. The top of the trough is configured to allow a line to pass through without deflection. The line engages the winch drum by snaking through a bottom of the trough. The line can be fed onto the winch drum in a straight line. As the line is drawn from the top of the trough toward the bottom of the trough, the line is gripped by the winch drum as the line is forced into the sinusoidal pattern.

Further aspects and embodiments are provided in the foregoing drawings, detailed description and claims.

BRIEF DESCRIPTION OF THE DRAWINGS

The following drawings are provided to illustrate certain embodiments described herein. The drawings are merely illustrative and are not intended to limit the scope of claimed inventions and are not intended to show every potential feature or embodiment of the claimed inventions. The drawings are not necessarily drawn to scale; in some instances, certain elements of the drawing may be enlarged with respect to other elements of the drawing for purposes of illustration.

DETAILED DESCRIPTION

Figure 1:
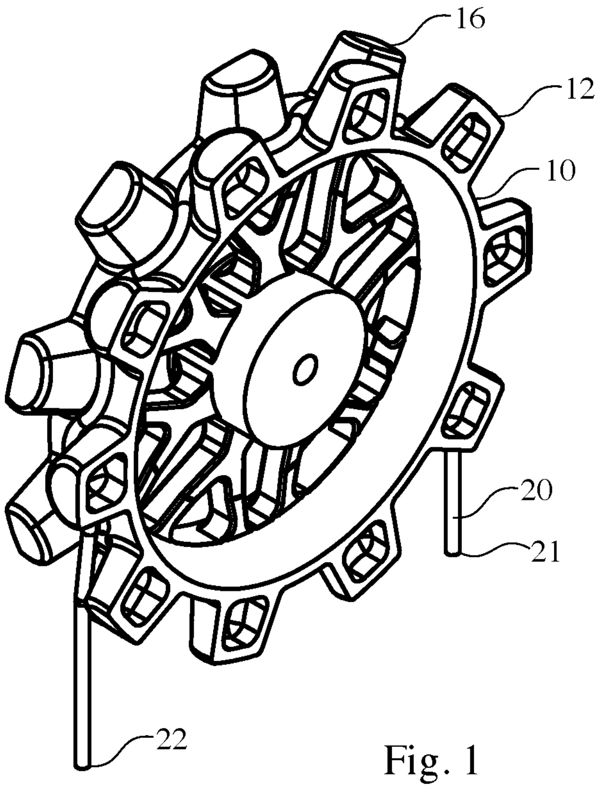
FIG. 1 is an isometric top-front-left view of a winch drum with line.

The following description recites various aspects and embodiments of the inventions disclosed herein. No particular embodiment is intended to define the scope of the invention. Rather, the embodiments provide non-limiting examples of various compositions, and methods that are included within the scope of the claimed inventions. The description is to be read from the perspective of one of ordinary skill in the art. Therefore, information that is well known to the ordinarily skilled artisan is not necessarily included.

DEFINITIONS

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms "a," "an," and "the" include plural referents unless the context clearly dictates otherwise. For example, reference to "a substituent" encompasses a single substituent as well as two or more substituents, and the like.

As used herein, "for example," "for instance," "such as," or "including" are meant to introduce examples that further clarify more general subject matter. Unless otherwise expressly indicated, such examples are provided only as an aid for understanding embodiments illustrated in the present disclosure and are not meant to be limiting in any fashion. Nor do these phrases indicate any kind of preference for the disclosed embodiment.

As used herein, "line" is meant to refer to any device or material that is long, cylindrical, thin, flexible, and having a high tensile strength. Preferably, this will be a braided rope, but wires, cords, string, twine, cable, strand, chains and combinations thereof may be used as well.

As used herein, "capstan effect" is meant to refer to the small holding force exerted on a line by one side of a cylinder and the line therefore being able to carry a much larger loading force on the other side, as shown in the Capstan equation. Rotation of the cylinder multiplies the applied tension by the friction between the line and the cylinder.

As used herein, “sinusoidal” means a wave-like, or undulating pattern, and is not limited to a precise sine wave.

As used herein, “frustoconical” refers to a shape that is generally cone-shaped with a flat top. It is not limited to perfect frustoconical shapes.

Capstan effect devices are used to lift and pull objects, but typical capstan effect devices have some limitations. The line wrapping around the drum overlaps or rubs against itself. The line naturally would exit and enter typical capstan effect devices at whatever location the line comes off the drum. The present invention makes multiple passes around the winch drum unnecessary. By providing a tortuous path for the line to follow, the line is engaged by friction at each redirection. Rather than only the friction of the single pass over the drum, the surface area is increased by making a groove along which the line undulates. Each change in direction is another point where the friction is increased, both downward, as in the traditional effect, but also to the side, into the walls of the groove, and the capstan effect is thereby amplified. With enough direction changes, a single pass is all that is necessary for a capstan-effect winch to be accomplished.

Now referring to FIG. 1, FIG. 1 is an isometric top-front-left view of a winch drum with line that may be used in one embodiment of the present invention. The winch drum 10 has a first set of teeth such as tooth 12, and those in line around the circumference of the drum with tooth 12, and a second set of teeth such as tooth 16 and those in line around the circumference of the drum with tooth 16. The first set of teeth are arranged next to one outer edge of the drum, and the second set are arranged next to the other edge of the winch drum 10. The second set of teeth 16 are shifted axially along the winch drum 10 from the first set of teeth 12 creating an offset in the spacing of the teeth. The offset aligns a tooth from the first set with a gap between two teeth from the second set, and a tooth from the second set corresponds to a gap between two teeth in the first set. This offset is such that a gap between the first set of teeth and the second set of teeth forms a sinusoidal channel for a line to follow. The gap created between the first set of teeth and second set of teeth is wide enough that the line 20, can pass through the gap. The tapering of the first set of teeth 12 and the second set of teeth 16 becomes a guide for the line 20 so that the line can 20 engage the sinusoidal path. The line 20 follows the sinusoidal path and each change of direction along the sinusoidal path causes the line 20 to engage by friction with the first set of teeth and the second set of teeth. The teeth taper from crown to base. In some embodiments, the teeth are frustoconical. In some other embodiments, the teeth are conical. In yet other embodiments, the teeth are dome shaped.

Figure 2:
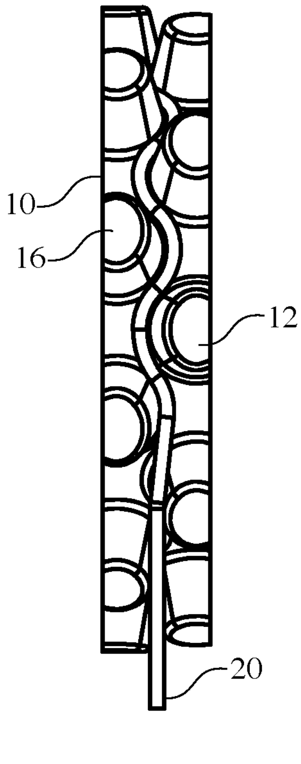
FIG. 2 is a left elevation view of the winch drum with line of FIG. 1.

FIG. 2 is a left elevation view of the winch drum with line of FIG. 1. The winch drum 10 has a first set of teeth such as tooth 12, and those in line around the circumference of the drum with tooth 12, and a second set of teeth such as tooth 16 and those in line around the circumference of the drum with tooth 16. The first set of teeth are arranged next to one outer edge of the drum, and the second set are arranged next to the other edge of the winch drum 10. The second set of teeth 16 are shifted axially along the winch drum 10 from the first set of teeth 12 creating an offset in the spacing of the teeth. The offset aligns a tooth from the first set with a gap between two teeth from the second set, and a tooth from the second set corresponds to a gap between two teeth in the first set. This offset is such that a gap between the first set of teeth and the second set of teeth forms a sinusoidal channel for a line to follow. The gap created between the first set of teeth and second set of teeth is wide enough that the line 20, can pass through the gap. The tapering of the first set of teeth 12 and the second set of teeth 16 becomes a guide for the line 20 so that the line can 20 engage the sinusoidal path. The line 20 follows the sinusoidal path and each change of direction along the sinusoidal path causes the line 20 to engage by friction with the first set of teeth and the second set of teeth. The tapered shape of the teeth is designed so that the line will slide to the base of the teeth as the line is spooled onto the winch drum, and the line will slide to the crown of the teeth as the line is unspooled from the winch drum.

Figure 3:
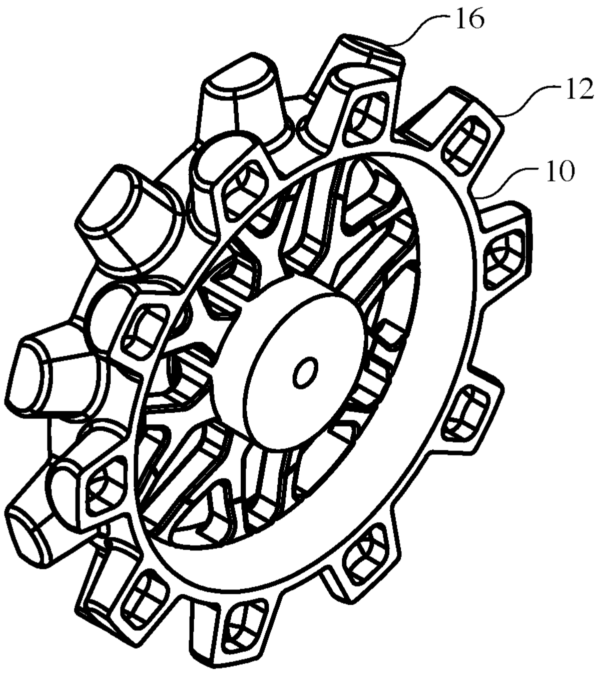
FIG. 3 is the isometric top-front-left view of FIG. 1 without the line.

FIG. 3 is the isometric top-front-left view of FIG. 1 without the line. The winch drum 10 has a first set of teeth such as tooth 12, and those in line around the circumference of the drum with tooth 12, and a second set of teeth such as tooth 16 and those in line around the circumference of the drum with tooth 16. The first set of teeth such as tooth 12 taper from a first base, such as base 14, to a first crown, such as crown 13. The second set of teeth 16 taper from a second base, such as base 18 to a second crown, such as crown 17. The first set of teeth are arranged next to one outer edge of the drum, and the second set are arranged next to the other edge of the winch drum 10. The second set of teeth 16 are shifted axially along the winch drum 10 from the first set of teeth 12 creating an offset in the spacing of the teeth. The offset aligns a tooth from the first set with a gap between two teeth from the second set, and a tooth from the second set corresponds to a gap between two teeth in the first set. The bases of the first set and the second set do not contact one another.

Figure 4:
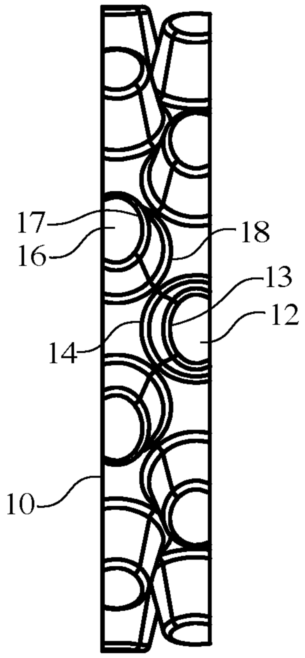
FIG. 4 is the left elevation view of FIG. 2 without the line.

FIG. 4 is the left elevation view of FIG. 2 without the line. The winch drum 10 has a first set of teeth such as tooth 12, and those in line around the circumference of the drum with tooth 12, and a second set of teeth such as tooth 16 and those in line around the circumference of the drum with tooth 16. The first set of teeth such as tooth 12 taper from a first base, such as base 14, to a first crown, such as crown 13. The second set of teeth 16 taper from a second base, such as base 18 to a second crown, such as crown 17. The first set of teeth are arranged next to one outer edge of the drum, and the second set are arranged next to the other edge of the winch drum 10. The second set of teeth 16 are shifted axially along the winch drum 10 from the first set of teeth 12 creating an offset in the spacing of the teeth. The offset aligns a tooth from the first set with a gap between two teeth from the second set, and a tooth from the second set corresponds to a gap between two teeth in the first set. The bases of the first set and the second set do not contact one another. The second set of teeth 16 are shifted axially along the winch drum 10 and offset from the first set of teeth 12 such that a gap between the first bases 14 and the second bases 18 forms a sinusoidal channel for a line to follow while a gap between the first crowns 13 and the second crowns 17 is wide enough that the line 20, when perpendicular to the axis of the winch drum 10, can be passed between the first crowns 13 and the second crowns 17 without touching. The tapering of the first set of teeth 12 and the second set of teeth 16 becomes a guide for the line 20 so that the line can 20 engage the sinusoidal path. The line 20 follows the sinusoidal path and each change of direction along the sinusoidal path causes the line 20 to engage by friction with the first bases 14 and the second bases 18. While the toothed winch drum is capable of interacting with lines of various diameters, a line with a dimeter sized to slide to the base of the teeth will have the greatest interaction with the teeth and will be less likely to slip. Systems that employ the toothed winch drum are designed in conjunction with the lines used with the toothed drums to ensure that the lines and toothed drum work together. A line of greater diameter will function best with a larger width toothed wheel. Ropes and lines of differing thickness and differing compressibility will affect the friction and grip ability of the toothed drum. Less movement down the teeth will occur with a line that is thicker and with a line that is less compressible. More movement down the teeth will occur with a line that is thinner or more compressible. A line that is too thin will not be gripped at all and will not function with the toothed drum. A line that is too thick will not slide deep enough into the groves of the toothed drum.

The winch drum and teeth are constructed of a lightweight, durable, and abrasion resistant material. In some embodiments, the material is a metal. In some embodiments where the drum is manufactured from a metal the metal is steel such as stainless steel. In other embodiments, utilizing metal, the metal is aluminum, anodized aluminum, or an aluminum alloy. In yet other embodiments utilizing metal, the metal is titanium, anodized titanium, or a titanium alloy. In some embodiments manufactured from a metal, the teeth or a portion of the teeth are covered or coated. In embodiments employing coverings or coatings, the coatings increase the friction and grip ability of the teeth. In some of these embodiments, only the base of the teeth and the sinusoidal channel are coated or covered. In other embodiments, the teeth are entirely coated or covered. Generally, the coating will be rubber, synthetic rubber, or another material that increases the friction and grip ability of the teeth. In some embodiments, the winch drum and teeth are manufactured from synthetic materials. In some embodiments, those synthetic materials are a plastic. In some embodiments the synthetic material is a combination of materials such as carbon fiber, fiberglass reinforced nylon, or other reinforced materials.

Figure 5:
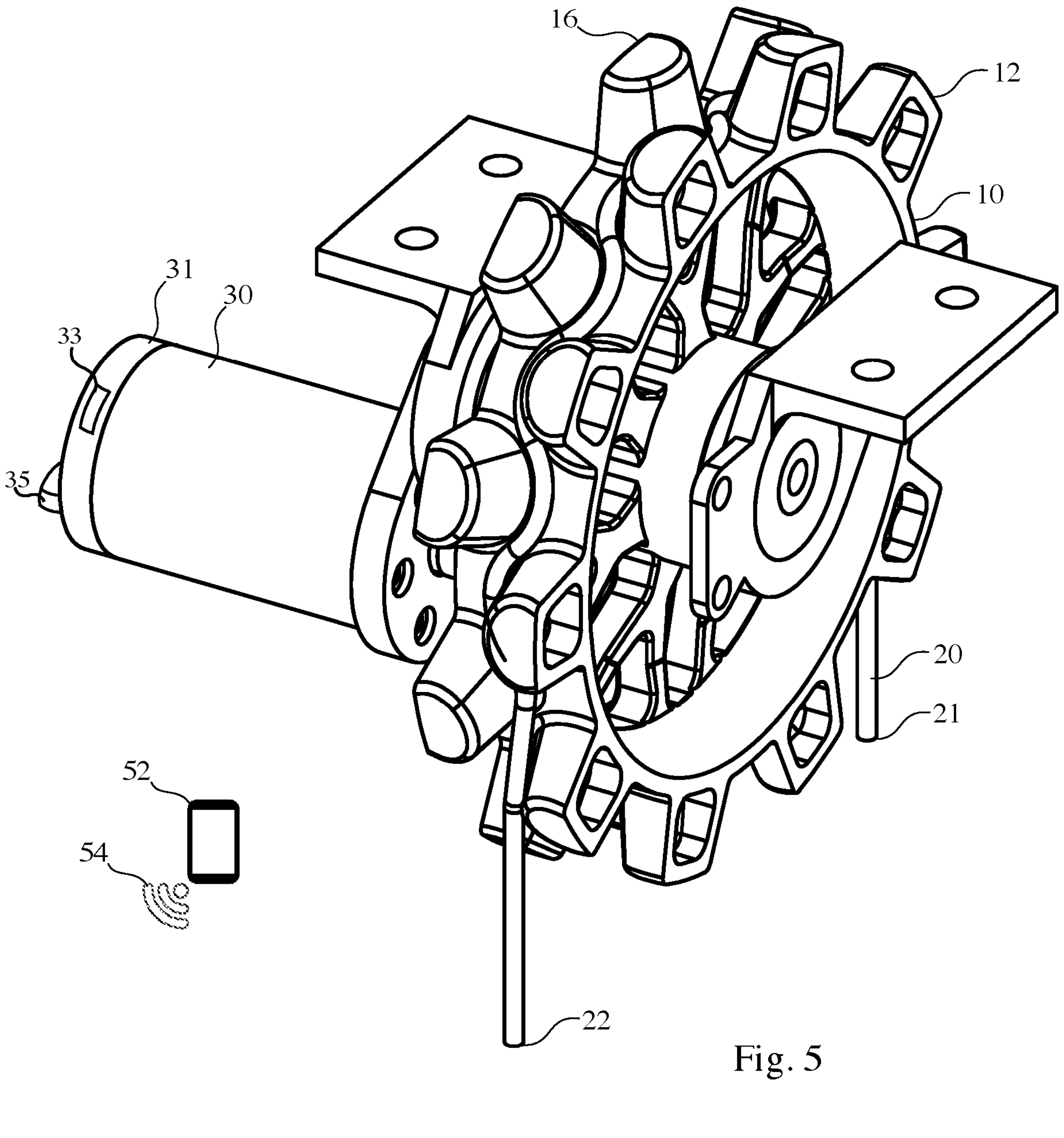
FIG. 5 is an isometric top-front-left view of the winch drum with line of FIG. 1 with a motor.

FIG. 5 is an isometric top-front-left view of the winch drum with line of FIG. 1 with a motor in one embodiment of the present invention. The motor 30 rotates the winch drum 10, thereby raising and lowering the object. The motor will turn the winch drum in either direction. As the motor turns in one direction one end 21 of the line 20 is lowered while a second end 22 of the line is raised. As the motor reverses direction, the first end 21 of the line 20 is raised and the second end 22 of the line is lowered. The frustoconical shape of the teeth aids in getting the line onto and off of the toothed drum. As the line enters the toothed drum the line hangs vertically. The line encounters a tooth of the first set of teeth and slides down the conical side of the tooth, when it reaches the base of the tooth, the line is no longer oriented vertically, but becomes a adopts the shape of the sinusoidal path created by the teeth. Each tooth changes the orientation of the line, this increases the friction of on the line, allowing the toothed drum to grip the line. Without the frustoconical shape of the teeth, the toothed drum would not engage with the line. If the teeth were cylindrical the line would hit the top of the teeth and not be accommodated in the sinusoidal path.

In some embodiments, the winch includes a controller 31, which is configured to receive instructions and transmit a signal to the motor 30 to rotate the winch drum. The controller is configured to work with remote devices. In some embodiments, the remote device is a winch specific remote control. In some other embodiments, the remote device is a universal remote. In yet other embodiments, the remote device is a smart device. In embodiments utilizing a smart device, the smart device 52 is configured to transmit instructions 54 to the controller 31. Generally, the instructions are included on an application running on the smart device, that includes a graphical user interface (GUI). The GUI includes specific icons for specific functions. For example, there will be an icon for rotating the winch in one direction and an icon for rotating the winch in the other direction. Often there are icons to lock the winch and to release the lock on the winch. In one embodiment, the motor is driven by a battery 35.

In one embodiment, the winch drum has sensors, such as sensor 33, that transmit information to the smart device. This information includes the force on the line, the position of the line in the winch drum, power remaining in a battery that drives the motor, current draw by the motor, and combinations thereof.

In an embodiment, the line 20 will be attached at a first end 21 to a counterweight or other tensioner and at a second end 22 to an object to be raised and lowered. As the winch drum 10 is rotated, the line 20 engages by friction with sides of the first set of teeth 12 and the second set of teeth 16 and raises and lowers the object. In some embodiments, the tensioner consists of a counterweight, a spring, or a second object pulling away from the device.

In one embodiment, the winch drum is mounted on and moves along a track such that the device lifts the object up, moves to a new location, and lowers the object down.

Figure 6:
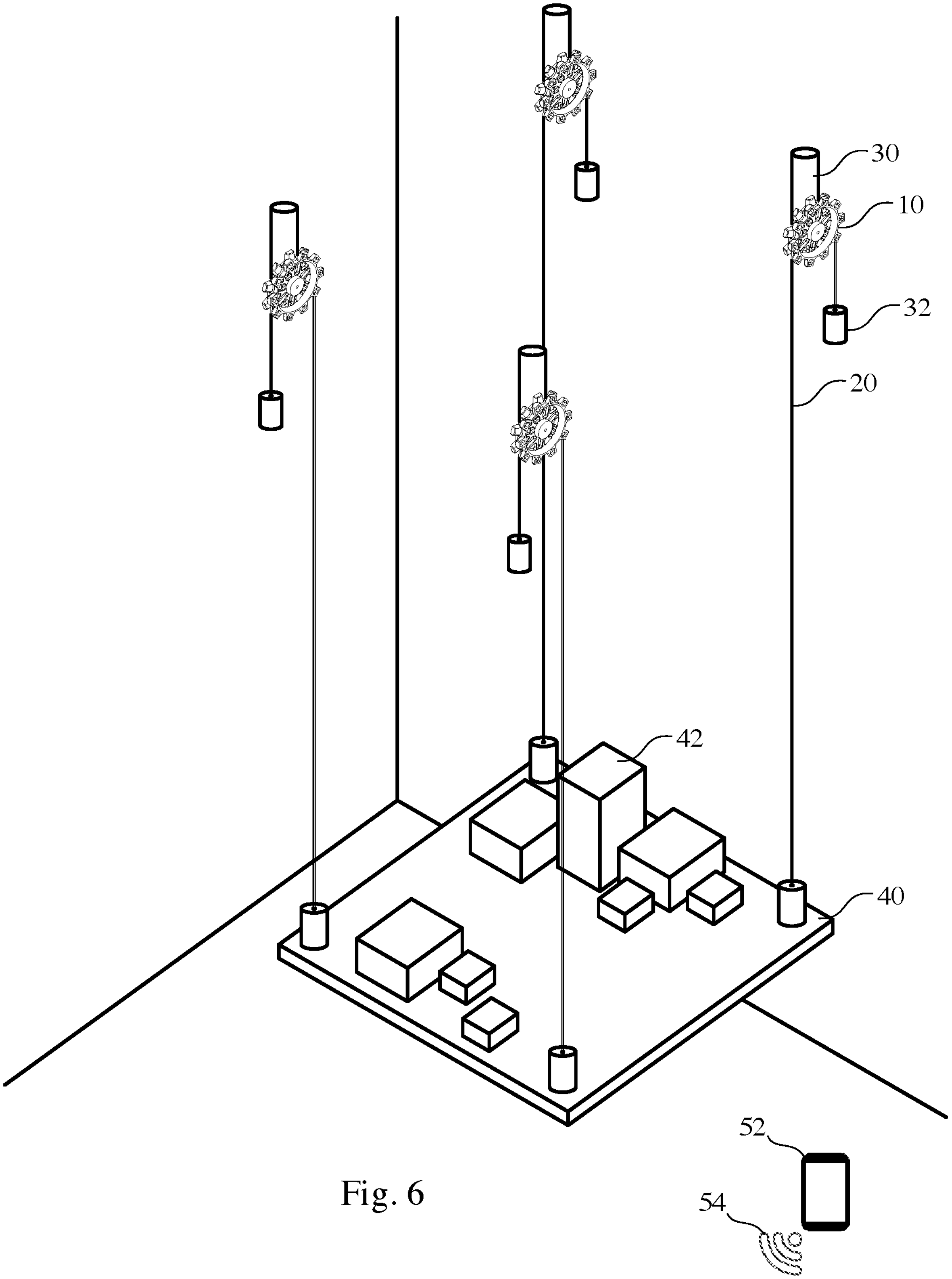
FIG. 6 is an isometric top-front-left view of the winch drum from FIG. 1 with a lowered platform.

FIG. 6 is an isometric top-front-left view of the winch drum from FIG. 1 with a lowered platform that may be used in one embodiment of the present invention. A platform 40 holds a plurality of objects 42. In this embodiment, they are unevenly spaced. The platform is held up by lines from four winches that are mounted above. For example, winch 10 with motor 30, line 20 and counterweight 32. The winch drums 10 raise and lower the platform 40, raising and lowering the objects 42. The winch drums 10 are driven by motors 30. Contained in the motors 30 are controllers configured to receive instructions and transmit a signal to the plurality of motors to rotate the winch drums of the winches 10. The controllers are configured to work in conjunction to lift and lower the platform. In this embodiment, a smart device 52 is configured to transmit instructions 54 to the controllers. The winches 10 contain sensors, such as those described earlier. In one embodiment, the sensors are load sensors that send load signals to the controllers. Each motor 30 is powered to handle the load at that corner of the platform 40 and evenly raise and lower the platform 40.

Figure 7:
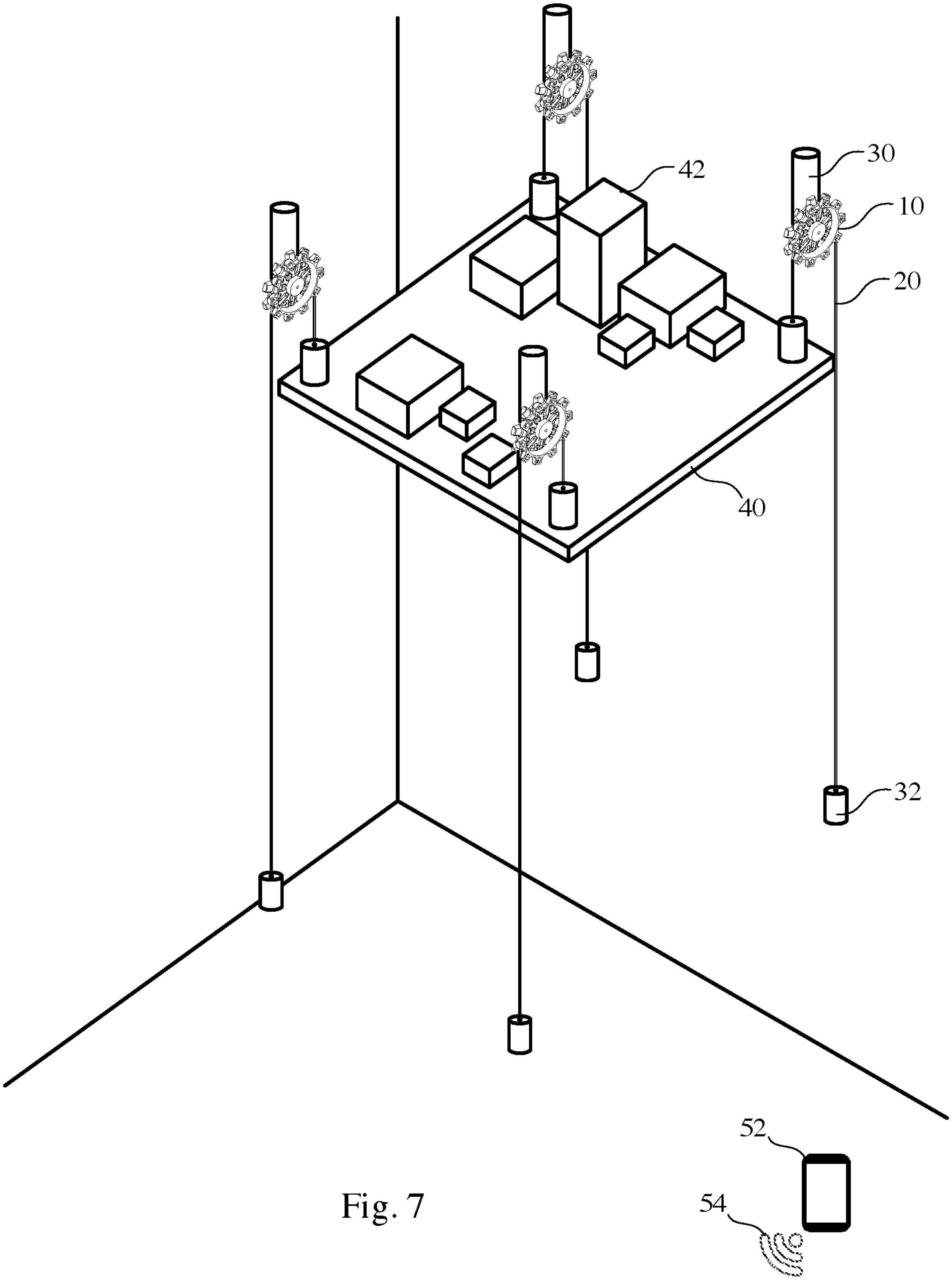
FIG. 7 is an isometric top-front-left view of FIG. 6 with the platform raised.

FIG. 7 is an isometric top-front-left view of FIG. 6 with the platform raised. A platform 40 holds a plurality of objects 42. In this embodiment, they are unevenly spaced. The platform is held up by lines 20 from four winches 10 that are mounted above. In some embodiments, these are stationary. In others, they are mounted to a moving track. The winches 10 raise and lower the platform 40, raising and lowering the objects 42. The winches 10 are driven by motors 30. Contained in the motors 30 are controllers configured to receive instructions and transmit a signal to the plurality of motors to rotate the winch drums of the winches 10. In this embodiment, a smart device 52 is configured to transmit instructions 54 to the controllers. The winches 10 contain load sensors that send load signals to the controllers. Each motor 30 is powered to handle the load at that corner of the platform 40 and evenly raise and lower the platform 40.

Figure 8:
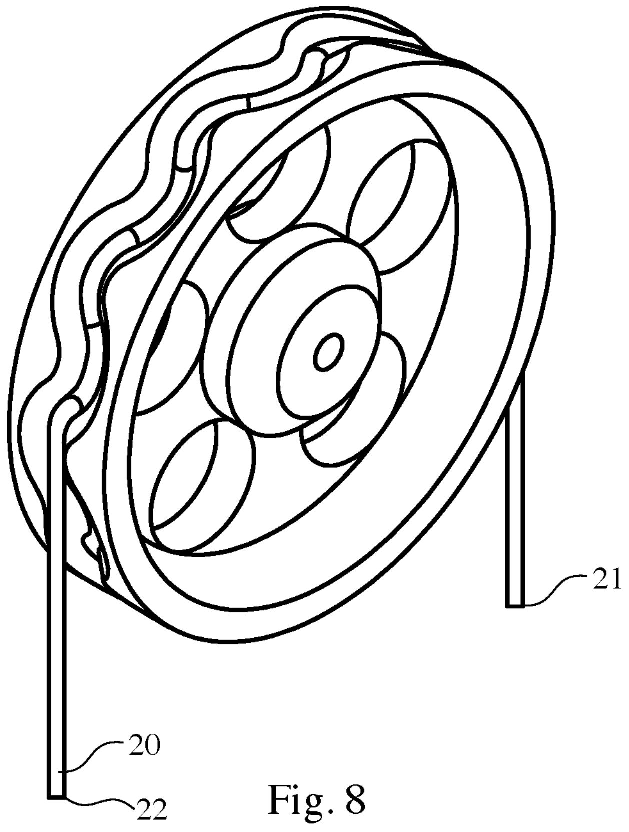
FIG. 8 is an isometric top-front-left view of a winch drum with line.

FIG. 8 is an isometric top-front-left view of a winch drum with line that may be used in one embodiment of the present invention. The winch drum 10 has a groove 11 for a line 20. The groove 11 is tapered and changes from a first shape at an outside surface 24 of the drum 10 to a second shape on an intermediate surface 26 between the outside surface and a center of the drum 10. The first shape is configured to allow the line 20 to pass through without deflection. The first shape consists of the space between the top of one side of the groove 13 and the top of the other side of the groove 17. The second shape is configured to cause the line to form a sinusoidal or undulating line. The second shape consists of the space between the bottom of one side of the groove 14 and the bottom of the other side of the groove 18. The first shape is less defined so that the line 20 can be fed onto the winch drum 10 in a straight line. As the line 20 encounters the outside surface, the angle of the groove draws the line from the outside surface 24 toward the intermediate surface 26. Additionally, as the trough transitions from outside surface to the center of the drum, the sinusoidal shape becomes more defined, this increases the amount of friction the trough imparts to the line. The line 20 is gripped in the bottom of the trough of the winch drum 10 as the line 20 is forced into the sinusoidal or undulating pattern.

Figure 9:
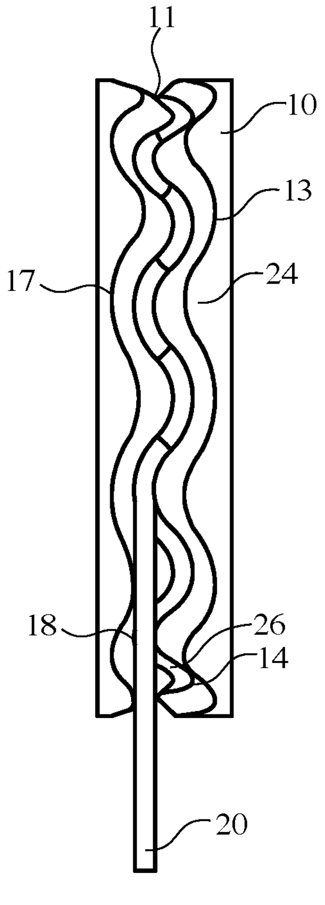
FIG. 9 is a left elevation view of the winch drum with line of FIG. 8.

FIG. 9 is a left elevation view of the winch drum with line of FIG. 8. The winch drum 10 has a groove 11 for a line 20. The groove 11 changes from a first shape at an outside surface 24 of the drum 10 to a second shape on an intermediate surface 26 between the outside surface and a center of the drum 10. The first shape is configured to allow the line 20 to pass through without deflection. The first shape consists of the space between the top of one side of the groove 13 and the top of the other side of the groove 17. The second shape is configured to cause the line to form an undulating line. The second shape consists of the space between the bottom of one side of the groove 14 and the bottom of the other side of the groove 18. The line 20 can be fed onto the winch drum 10 in a straight line, and whereby as the line 20 is drawn from the outside surface 24 toward the intermediate surface 26, the line 20 is gripped by the winch drum 10 as the line 20 is forced into the undulating pattern.

In another embodiment, a winch drum is provided. A trough encircles the winch drum. The trough is narrower at a bottom of the trough. The trough is wider at a top of the trough. The trough follows a sinusoidal or wave pattern. The top of the trough is configured to allow a line to pass through without deflection. The line engages the winch drum by snaking through a bottom of the trough. The line can be fed onto the winch drum in a straight line. As the line is drawn from the top of the trough toward the bottom of the trough, the line is gripped by the winch drum as the line is forced into the sinusoidal pattern.

In still other embodiments, the winch drum described above is used as a line tensioner for a capstan winch. In other words, the line gripping drum is used to keep tension on a line that is fed around the capstan or the pulleys of a multiple-pulley capstan device, such as that described in co-pending U.S. Published Patent Application No. 2021-0285525 titled "Capstan Effect Device." The entire disclosure of this published application is incorporated herein by reference.

The invention has been described with reference to various specific and preferred embodiments and techniques. Nevertheless, it is understood that many variations and modifications may be made while remaining within the spirit and scope of the invention.

What is claimed is:

1. A winch drum, comprising:

a first set of teeth around an outer perimeter of a drum, the first set of teeth tapering from a first base to a first crown;

a second set of teeth around the outer perimeter of the drum, the second set of teeth tapering from a second base to a second crown;

the second set of teeth shifted axially along the drum and offset from the first set of teeth such that a gap between the first bases and the second bases forms a sinusoidal channel for a line to follow;

whereby the tapering of the first set of teeth and the second set of teeth becomes a guide for the line so that the line can engage the sinusoidal channel;

wherein the line follows the sinusoidal channel and each change of direction along the sinusoidal channel causes the line to engage by friction with the first bases and the second bases;

wherein the teeth are frustoconical in shape.

2. The winch drum of claim 1, further comprising an object attached to a first end of the line and a tensioner attached to a second end of the line, and whereby as the winch drum is rotated, the line engages by friction with sides of the first set of teeth and sides of the second set of teeth and raises and lowers the object.

3. The winch drum of claim 2, wherein the tensioner comprises a counterweight.

4. The winch drum of claim 1, further comprising a motor that rotates the winch drum.

5. The winch drum of claim 4, further comprising a controller configured to receive instructions and transmit a signal to the motor to rotate the winch drum.

6. The winch drum of claim 5, further comprising a remote device configured to transmit instructions to the controller.

7. The winch drum of claim 6, further comprising sensors that transmit information to the remote device, the sensors transmitting information selected from the group consisting of a force on the line, a position of the line in the winch drum, power remaining in a battery that drives the motor, current draw by the motor, and combinations thereof.

8. The winch drum of claim 4, further comprising a battery that powers the motor.

* * * * *